US012649154B2

(12) United States Patent
Li et al.

(10) Patent No.: US 12,649,154 B2
(45) Date of Patent: Jun. 9, 2026

(54) MICRO-NANO FLUIDIC SUBSTRATE, CHIP, PREPARATION METHOD AND SYSTEM

(71) Applicant: BOE Technology Group Co., Ltd., Beijing (CN)

(72) Inventors: Feifei Li, Beijing (CN); Bolin Fan, Beijing (CN); Ce Ning, Beijing (CN); Zhengliang Li, Beijing (CN); Hehe Hu, Beijing (CN); Nianqi Yao, Beijing (CN); Jiayu He, Beijing (CN); Jie Huang, Beijing (CN); Kun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 720 days.

(21) Appl. No.: 18/018,795

(22) PCT Filed: Dec. 31, 2021

(86) PCT No.: PCT/CN2021/143556

§ 371 (c)(1),
(2) Date: Jan. 30, 2023

(87) PCT Pub. No.: WO2023/123314

PCT Pub. Date: Jul. 6, 2023

(65) Prior Publication Data

US 2024/0261785 A1 Aug. 8, 2024

(51) Int. Cl.
*B01L 3/00* (2006.01)

(52) U.S. Cl.
CPC . *B01L 3/502761* (2013.01); *B01L 2200/0647* (2013.01); *B01L 2200/12* (2013.01);
(Continued)

(58) Field of Classification Search
CPC ....... B01L 3/502761; B01L 2200/0647; B01L 2200/12; B01L 2300/0645;
(Continued)

(56) References Cited

U.S. PATENT DOCUMENTS

2008/0233011 A1* 9/2008 Gundel ............. B01L 3/502707 428/411.1
2010/0055673 A1 3/2010 Agarwal et al.
(Continued)

FOREIGN PATENT DOCUMENTS

CN 101561446 A 10/2009
CN 102242062 A 11/2011
(Continued)

OTHER PUBLICATIONS

Office Action dated Mar. 31, 2026, issued in counterpart Chinese patent application No. 202180004392.7 with English translation (10 pages).

*Primary Examiner* — Brian J. Sines
(74) *Attorney, Agent, or Firm* — WHDA, LLP

(57) ABSTRACT

Provided is a micro-nano fluidic substrate, a chip, a preparation method, and a system. The micro-nano fluidic substrate includes: a base; an electrode layer located on the base, the electrode layer includes a first electrode, a second electrode, and a control electrode; and a film layer located on the electrode layer and far away from the base, the film layer includes a groove layer, a nano-channel and a micro-channel, the groove layer includes a first groove, the nano-channel is located in the first groove, an orthographic projection of the nano-channel on the base at least partially coincides with an orthographic projection of the control electrode on the base, and the micro-channel is in communication with the nano-channel, the micro-channel includes a first micro-channel and a second micro-channel, and the first micro-channel is in communication with the first electrode, the second micro-channel is in communication with the second electrode.

16 Claims, 10 Drawing Sheets

(52) U.S. Cl.
CPC .................. *B01L 2300/0645* (2013.01); *B01L 2300/0848* (2013.01); *B01L 2400/0415* (2013.01)

(58) Field of Classification Search
CPC ..... B01L 2300/0848; B01L 2400/0415; B01L 3/502707; B01L 3/00; B81C 1/00
See application file for complete search history.

(56) References Cited

U.S. PATENT DOCUMENTS

| | | | |
|---|---|---|---|
| 2013/0037410 | A1 | 2/2013 | Xu et al. |
| 2015/0276709 | A1 | 10/2015 | O'Halloran et al. |
| 2021/0229977 | A1 | 7/2021 | Ma et al. |
| 2022/0126294 | A1 | 4/2022 | Ma et al. |

FOREIGN PATENT DOCUMENTS

| | | | |
|---|---|---|---|
| CN | 104703700 | A | 6/2015 |
| CN | 108097338 | A | 6/2018 |
| CN | 109967150 | A | 7/2019 |
| CN | 112368234 | A | 2/2021 |
| CN | 113145183 | A | 7/2021 |
| CN | 113546698 | A | 10/2021 |
| KR | 10-1128015 | B1 | 3/2012 |
| WO | 2007/046485 | A1 | 4/2007 |
| WO | 2019023945 | A1 | 2/2019 |

* cited by examiner

MICRO-NANO FLUIDIC SUBSTRATE, CHIP, PREPARATION METHOD AND SYSTEM

CROSS-REFERENCE TO RELATED APPLICATION

This application is a Section 371 National Stage Application of International Application No. PCT/CN2021/143556, filed on Dec. 31, 2021, entitled "MICRO-NANO FLUIDIC SUBSTRATE. CHIP, PREPARATION METHOD AND SYSTEM", the content of which is hereby incorporated by reference in its entirety.

TECHNICAL FIELD

The present disclosure relates to a field of biochemical detection, and in particular, to a micro-nano fluidic substrate, a chip, a preparation method and a system.

BACKGROUND

Microfluidics and Nanofluidics is an emerging leading-edge interdisciplinary discipline involving physics, chemistry, engineering, materials and biology. A micro-nano fluidic chip has attracted great attention from academia and industry due to its advantages such as miniaturization, integration, automation, portability, high throughput, low cost, low power consumption, and high precision and wide applications. The micro-nano fluidic chip is different from a microfluidic chip in that the micro-nano fluidic chip contains a nano structure with smaller size, which mainly manipulates biological or chemical samples through a nano-channel structure to achieve the function of the chip.

Charge changing caused by bases in nanopore sequencing are mainly characterized by current fluctuation parameters, including a current fluctuation amplitude and a current fluctuation duration. However, in general, since a single DNA molecule moves too fast in a nanopore, the current fluctuation amplitude caused by base size and structure differences is small and the duration is short, and the current fluctuation is vulnerable to external current noise, resulting in insufficient detection accuracy. This undoubtedly severely limits a development of nanopore sequencing, technology.

SUMMARY

In view of above, embodiments of the present disclosure provide a micro-nano fluidic substrate, a chip, a preparation method and a system.

According to an aspect of the present disclosure, there is provided a micro-nano fluidic substrate, including:

a base;

an electrode layer located on the base, wherein the electrode layer includes a first electrode, a second electrode, and a control electrode; and a film layer located on the electrode layer and far away from the base, wherein the film layer includes a groove layer, a nano-channel and a micro-channel, the groove layer includes a first groove, the nano-channel is located in the first groove, an orthographic projection of the nano-channel on the base at least partially coincides with an orthographic projection of the control electrode on the base, and the micro-channel is in communication with the nano-channel, wherein the micro-channel includes a first micro-channel and a second micro-channel, an orthographic projection of the first micro-channel on the base is located on a first side of an orthographic projection of the nano-channel on the base, the first micro-channel is in communication with the first electrode, an orthographic projection of the second micro-channel on the base is located on a second side of the orthographic projection of the nano-channel on the base, the second micro-channel is in communication with the second electrode, and the first side and the second side are opposite sides of the orthographic projection of the nano-channel on the base.

For example, according to embodiments of the present disclosure, an aspect ratio of the first groove is greater than 0.3.

For example, according to embodiments of the present disclosure, the substrate further includes: a ground electrode configured as a reference electrode for the first electrode, the second electrode and the control electrode, wherein the ground electrode is located on a side of the film layer away from the base, and an orthographic projection of the ground electrode on the base is at least partially overlapped with the orthographic projection of the control electrode on the base.

For example, according to embodiments of the present disclosure, a second material layer is filled between the first electrode and the control electrode, and between the second electrode and the control electrode.

For example, according to embodiments of the present disclosure, the substrate includes one first electrode, one second electrode, one control electrode and M nano-channels, where M≥1.

For example, according to embodiments of the present disclosure, the substrate includes M first electrodes, M second electrodes, one control electrode and M nano-channels, where M≥2.

For example, according to embodiments of the present disclosure, the substrate includes one first electrode, one second electrode. M control electrodes and M nano-channels, where M≥2.

For example, according to embodiments of the present disclosure, the substrate includes M first electrodes. M second electrodes. M control electrodes and M r nano-channels, where M≥2.

According to another aspect of the present disclosure, there is provided a micro-nano fluidic chip, including the substrate described above.

For example, according to embodiments of the present disclosure, the chip further includes:

a cover plate located above the substrate; and a bonding layer located above the substrate and configured to bond the substrate and the cover plate, wherein the cover plate includes:

a second groove, wherein an orthographic projection of the second groove on the base covers an orthographic projection of the micro-channel on the base;

a liquid inlet configured to add a sample to be tested; and a liquid outlet configured to export the sample after a test is finished.

According, to another aspect of the present disclosure, there is provided a method for preparing a micro-nano fluidic substrate, including:

forming a metal film layer on a base;

etching the metal film layer to obtain a first electrode, a second electrode and a control electrode, so as to form an electrode layer;

preparing a groove layer including a first groove on a surface of the electrode layer;

depositing a first material layer in the first groove using a ballistic deposition method, so as to form a nano-channel; and etching the first material layer in a direction perpendicular to the nano-channel, so as to obtain a micro-channel.

For example, according to embodiments of the present disclosure, the method, before the preparing a groove layer including a first groove on a surface of the electrode layer, further includes:

depositing a second material layer on the electrode layer to prevent the control electrode from being in communication with the nano-channel or the micro-channel.

For example, according to embodiments of the present disclosure, in the depositing a first material layer in the first groove using a ballistic deposition method, an aspect ratio of the first groove is greater 0.3, and a thickness of the deposited first material layer is 600 nm.

For example, according to embodiments of the present disclosure, the method further includes: preparing a ground electrode above the nano-channel.

According to another aspect of the present disclosure, there is provided a method for preparing a micro-nano fluidic chip, including:

preparing a substrate according to the method described above;

depositing a bonding layer on the substrate;

etching the bonding layer in a direction perpendicular to the nano-channel, so as to form a micro-channel; and bonding the bonding layer with the cover plate.

According to another aspect of the present disclosure, there is provided a micro-nano fluidic system, including the micro-nano fluidic chip described above and a power supply.

A detection accuracy may be improved through the micro-nano fluidic substrate, the chip, the preparation method and the system according to embodiments of the present disclosure.

BRIEF DESCRIPTION OF THE DRAWINGS

The features and advantages of the present disclosure will become more apparent from the detailed description of exemplary embodiments of the present disclosure with reference to the drawings, wherein.

DETAILED DESCRIPTION

Figure 1:
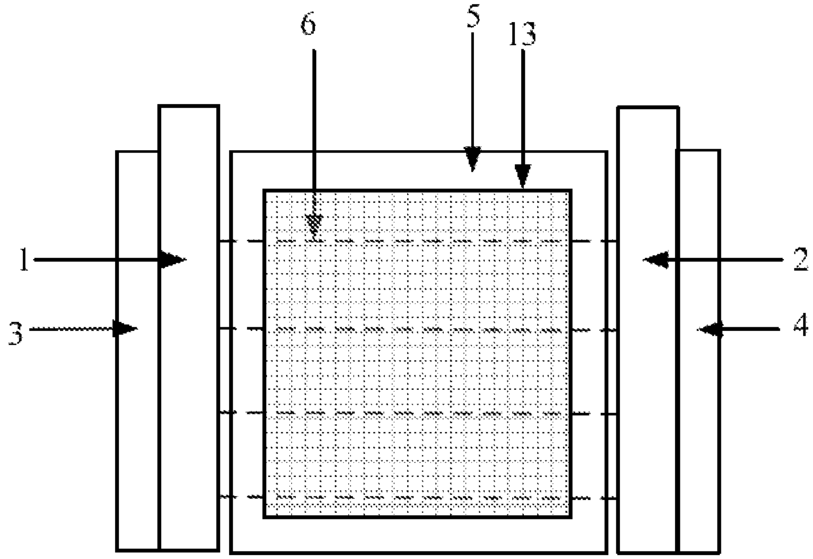
FIG. 1 schematically shows a top view of a micro-nano fluidic substrate according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms “comprising”, “including” and the like used herein specify a presence of the feature, step, operation and/or component, but do not preclude a presence or addition of one or more other features, steps, operations or components.

Where expressions like “at least one of A, B, or C, etc.” are used, they should generally be interpreted in accordance with the meaning of the expressions as commonly understood by those skilled in the art (e.g., “a system having at least one of A, B or C” should include, but not be limited to, a system having A alone, having B alone, having C alone, having A and B, having A and C, having B and C, and/or having A. B, C, etc. The terms “first” and “second” are used for descriptive purposes' only and are not to be construed as indicating or implying relative importance or to implicitly indicate the number of technical features indicated. Thus, features defined as "first" and "second" may explicitly or implicitly include one or more of the described features.

Ballistic deposition refers to a deposition method with different deposition rates at different deposition positions. The deposition rates at different deposition positions may be adjusted according to actual conditions to obtain a specific deposition film layer shape.

Microfluidics and Nanofluidics is an emerging leading-edge interdisciplinary discipline involving physics, chemistry, engineering, materials and biology. A micro-nano fluidic chip has attracted great attention from academia and industry due to its advantages such as miniaturization, integration, automation, portability, high throughput, low cost, low power consumption, and high precision and wide applications. The micro-nano fluidic chip is different from a microfluidic chip in that the micro-nano fluidic chip contains a nano structure with smaller size, which mainly manipulates biological or chemical samples through a nano-channel structure to achieve the function of the chip. However, due to the superior difficulty and high cost of preparing a nano-channel structure, the development of micro-nano fluidic technology and industry is severely restricted. So far, there are no commercial products based on the micro-nano fluidic chip in the market.

Currently reported sequencing methods include the followings.

The first generation sequencing (Sanger sequencing) is a sequencing of human genome. This method uses the DNA to be tested as a template for DNA amplification, and at the same time uses a kind of termination nucleotide (ddNTP) to interfere with the process, so as to obtain a large number of DNA fragments with the same starting point and different ending points. These fragments are arranged by length through electrophoresis, and successively pass through a laser window. Since different end points of DNA fragments generate different fluorescence, a DNA sequence may be obtained by analyzing fluorescence color and length of DNA fragments. This method has the advantages of long sequencing reading length, short time consumption, high precision and the like, but has low flux and high cost.

The second generation sequencing (NGS sequencing) is high-throughput sequencing. This method first modifies the ends of DNA fragments and adds splices, and then performs amplification using primers complementary to splices by PCR or other methods to complete library construction, and finally performs computer sequencing through slight differences in the electric potential of a reaction system. This method may perform sequencing while synthesizing, and overcome the defects of low sequencing flux and high cost in the first generation sequencing. However, the sequencing reading length of this method is generally short and takes a long, time, and the amplification process takes a long time and information is easy to be lost.

The third generation sequencing is single molecule or nanopore sequencing. Since the second generation sequencing technology has the defects of short reading length and long time consuming, the third generation sequencing technology starts from long reading length and short time consuming. However, the third generation sequencing is not fully mature at present, and there are large differences between various sequencers, and the sequencing principles are also different. For example. Pacific Bioscience Company uses a microscope to detect the fluorescence released by dNTP reaction marked by fluorescent group dining a process of DNA synthesis by PCR: the sequencer developed by Oxford University, which has not been put into production, is used to detect the nucleotides "dropped" into the detection wells when DNA is cut by exonuclease. In addition, nanopore sequencing is also becoming the focus of current research. This method detects the arrangement sequence of DNA molecules by detecting the different current changing caused by the size and structure of A, T, C, and G bases when DNA molecules pass through a nanopore. This method may sequence single DNA or RNA molecules without PCR amplification or labeling of samples, and the method has the potential of relatively low-cost genotyping, high test mobility and rapid sample processing, and may display the detection results in real time. The charge changing caused by base in nanopore sequencing is mainly characterized by current fluctuation parameters, including a current fluctuation amplitude $\Delta I$ and a current fluctuation duration $\Delta t$. However, in general, since a single DNA molecule moves too fast in the nanopore, the current fluctuation amplitude caused by base size and structure differences is small and the duration is short, and the current fluctuation is vulnerable to external current noise, which undoubtedly severely limits the development of nanopore sequencing technology.

Therefore, embodiments of the present disclosure propose a micro-nano fluidic substrate. The substrate, through a comprehensive action of a first electrode, a second electrode and a control electrode with an ion selectivity of a nano-channel, implements a function of slowing the translocation of biomolecules, and overcomes the problems such as insufficient detection accuracy caused by a rapid movement of biomolecules in the traditional nanopore sequencing method. Furthermore, a chip manufactured by the substrate may be integrated with nanopore or other single molecule sequencing units to achieve large-scale high-throughput sequencing.

FIG. 1 schematically shows a top view of a micro-nano fluidic substrate according to embodiments of the present disclosure.

Figure 11A:
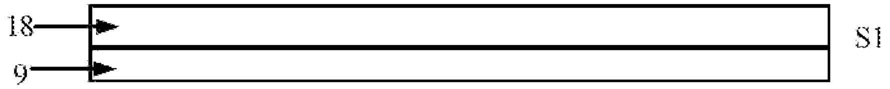
FIG. 11A to FIG. 11E schematically show cross-sectional views of a micro-nano fluidic substrate formed after some steps of a method for preparing a micro-nano fluidic substrate have been performed, in a direction perpendicular to a nano-channel, according to embodiments of the present disclosure.
Figure 11B:
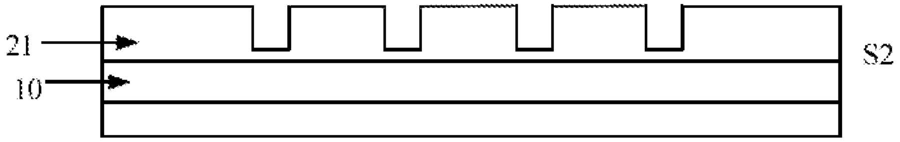
Figure 11C:
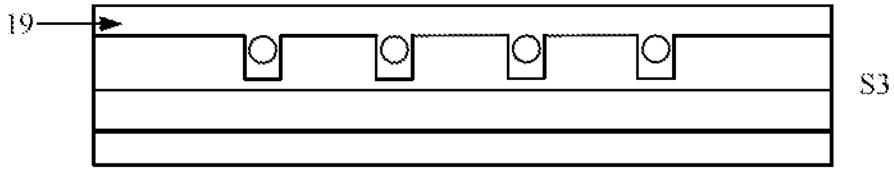
Figure 11D:
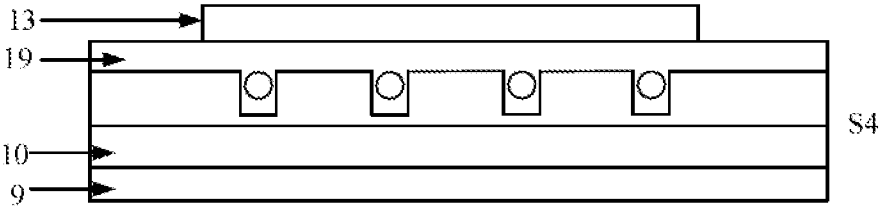
Figure 11E:
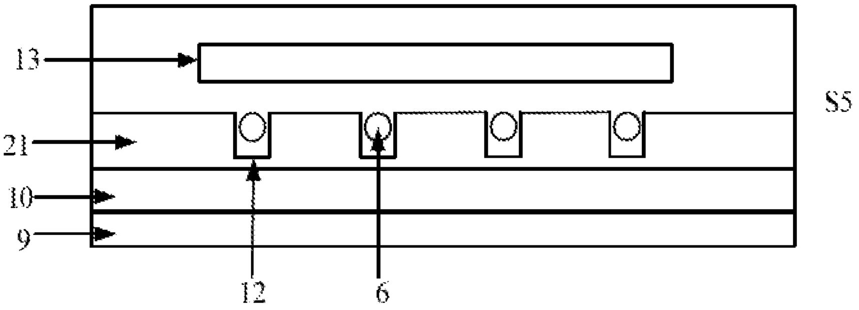
Figure 12A:
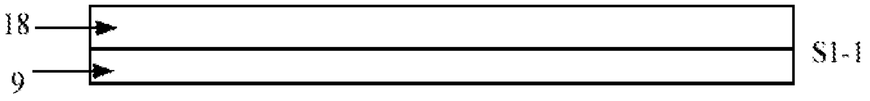
FIG. 12A to FIG. 12I schematically show cross-sectional views of a micro-nano fluidic substrate formed after some steps of a method for preparing a micro-nano fluidic substrate have been performed, in a direction parallel to a nano-channel, according to embodiments of the present disclosure.
Figure 12B:
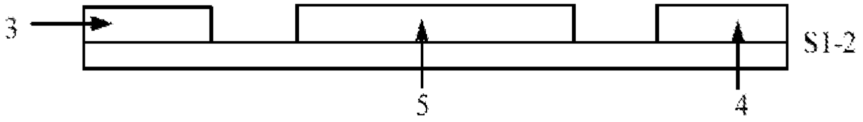
Figure 12C:
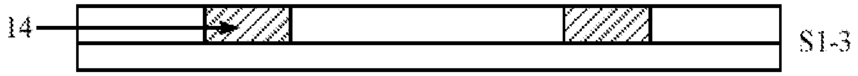
Figure 12D:
Figure 12E:
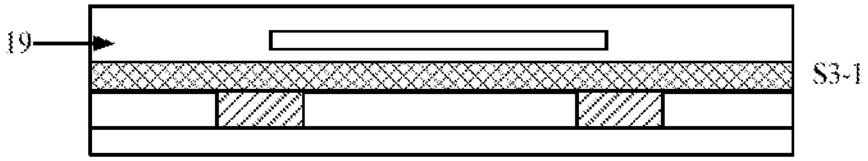
Figure 12F:
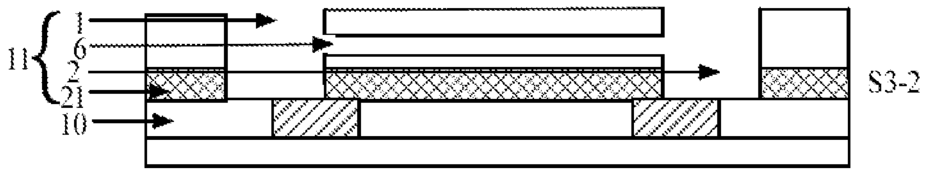

As shown in FIG. 1, the micro-nano fluidic substrate according to embodiments of the present disclosure includes a base, an electrode layer and a film layer. Exemplarily, the base may be a glass base, or other bases may be selected according to actual conditions, which is not limited in the present disclosure. The electrode layer is located on the base, and the electrode layer includes a first electrode 3, a second electrode 4 and a control electrode 5, wherein an orthographic projection of the first electrode 3 on the base is located on a first side of an orthographic projection of the nano-channel 6 on the base, and an orthographic projection of the second electrode 4 on the base is located on a second side of the orthographic projection of the nano-channel 6 on the base, the first side and the second side are opposite sides of the orthographic projection of the nano-channel on the base, and the orthographic projection of the control electrode 5 on the base is located between the orthographic projections of the first electrode 3 and the second electrode 4 on the base. A film layer 11 is located on an electrode layer 10 (as shown in FIG. 12F) The film layer is a multilayer structure. The film layer 11 includes a groove layer 21, a nano-channel 6, a first micro-channel 1 and a second micro-channel 2. The groove layer 21 includes a first groove 12 (as shown in FIG. 11E). The first groove 12 is used to accommodate the nano-channel 6, and the nano-channel 6 is located in the first groove 12, and the nano-channel 6 is formed by a first material layer 19 in the first groove 12. It should be noted that the first material layer 19 includes oxides formed by silicon and oxygen, such as silicon dioxide, which is not limited in embodiments of the present disclosure. The orthographic projection of the nano-channel 6 on the base at least partially coincides with the orthographic projection of the control electrode 5 on the base, and the micro-channel is in communication with the nano-channel 6. The micro-channel includes a first micro-channel 1 and a second micro-channel 2. The orthographic projection of the first micro-channel 1 on the base is located on a first side of the orthographic projection of the nano-channel 6 on the base, and the first micro-channel 1 is in communication with the first electrode 3. The orthographic projection of the second micro-channel 2 on the base is located on the second side of the orthographic projection of the nano-channel 6 on the base, and the second micro-channel 2 is in communication with the second electrode 4. The first side and the second side are opposite sides of the orthographic projection of the nano-channel on the base.

In embodiments of the present disclosure, the orthographic projections of the first micro-channel 1 and the second micro-channel 2 on the base are perpendicular to the orthographic projection of the nano-channel 6 on the base, so as to facilitate a sample to be measured in the nano-channel 6 to flow into the nano-channel.

As shown in FIG. 1, in embodiments of the present disclosure, each chip includes a plurality of nano-channels 6 (in a horizontal direction, only four are schematically shown in FIG. 1), the first micro-channel 1 and the second micro-channel 2 (in a vertical direction), wherein the nano-channels and the micro-channels are perpendicular to each other. For example, a length of the nano-channel 6 is 40 μm, a width of the nano-channel 6 is 10 nm, a depth of the nano-channel 6 is 60 nm, and a spacing between two adjacent nano-channels 6 is 1 min. For example, a length of the first micro-channel 1 and the second micro-channel 2 is 5 mm, and a width and a depth the first micro-channel 1 and the second micro-channel 2 are both 50 μm.

In embodiments of the present disclosure, an aspect ratio of the first groove 12 is greater than 0.3, and a groove layer 21 may be prepared by nanoimprint, EBL, or the like.

Figure 12G:
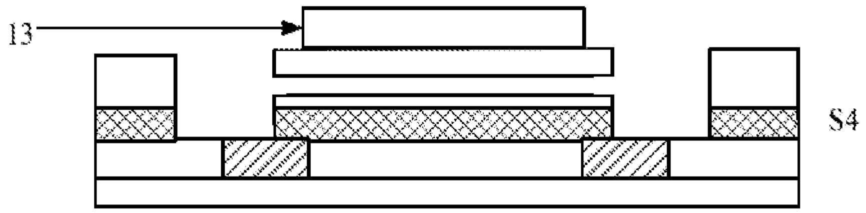
Figure 12H:
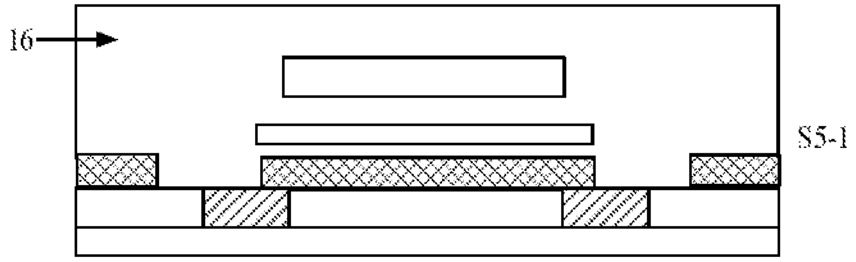
Figure 12I:
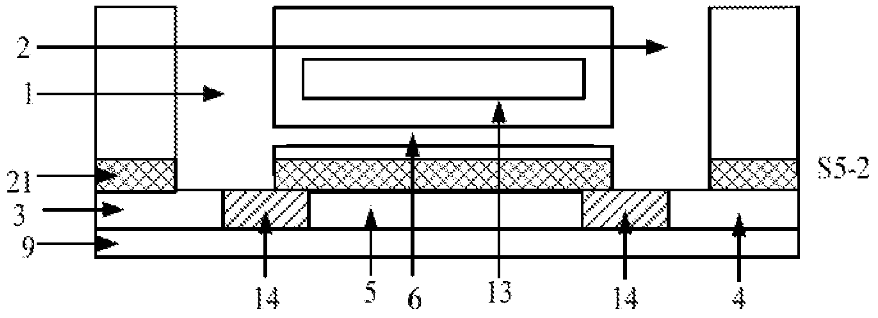

In embodiments of the present disclosure, the substrate further includes: a ground electrode 13, which is used as a reference electrode for the first electrode 3, the second electrode 4 and the control electrode 5, and voltage values applied to the first electrode 3, the second electrode 4 and the control electrode 5 may be adjusted according, to a potential of the ground electrode 13. The ground electrode 13 is located at a side of the film layer 11 away from the base 9 (as shown in FIG. 12F and FIG. 12G), an orthographic projection of the ground electrode 13 on the base is at least partially overlapped with an orthographic projection of the control electrode 5 on the base (as shown in FIG. 1), and the size of the ground electrode 13 may be the same as the size of the control electrode 5, or less than the size of the control electrode 5, as long as the ground electrode 13 is not in communication with the micro-channel.

Figure 7A:
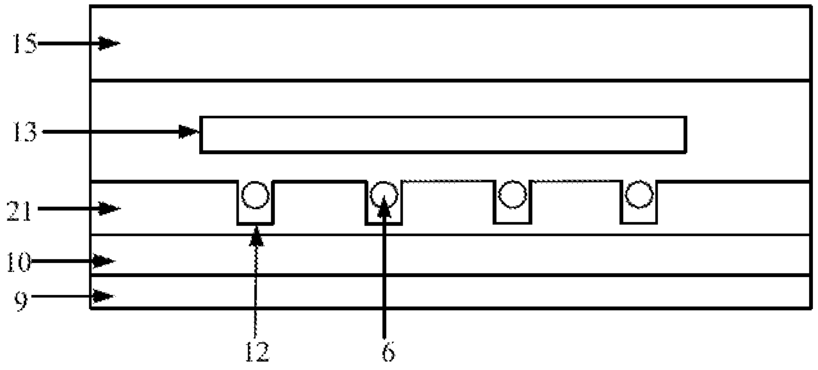
FIG. 7A schematically shows a cross-sectional view of a micro-nano fluidic chip in a direction perpendicular to a nano-channel according to embodiments of the present disclosure.
Figure 7B:
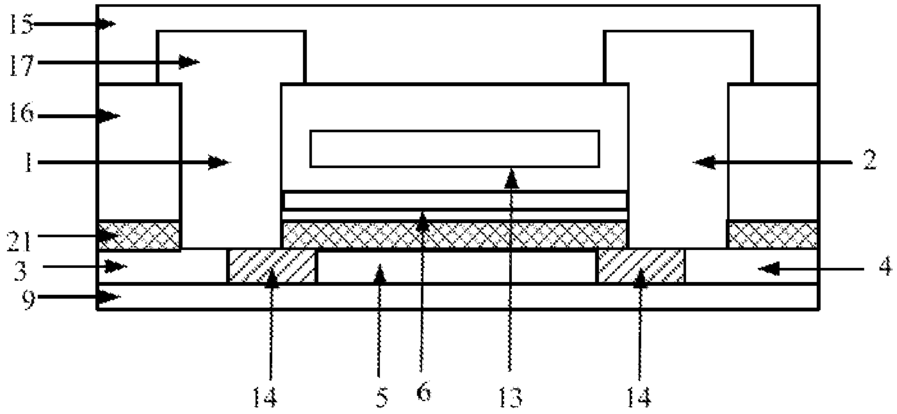
FIG. 7B schematically shows a cross-sectional view of a micro-nano fluidic chip in a direction parallel to a nano-channel according to embodiments of the present disclosure.

In embodiments of the present disclosure, a second material layer 14 (as shown in FIG. 7B) is filled between the first electrode 3 and the control electrode 5, and between the second electrode 4 and the control electrode 5. The second material layer 14 is used to prevent the control electrode 5 from being in communication with the nano-channel 6 or the micro-channel. If the control electrode 5 directly contacts a sample solution in the micro-channel and nano-channel, the chip will fail. In addition, when the first groove 12 (as shown in FIG. 7B) is formed, there will be an etching mismatch. The second material layer 14 may fill the mismatch generated by etching, effectively avoiding the imprinting or EBL pattern loss caused by the etching mismatch.

It should be noted that the second material layer 14 includes oxides formed by silicon and oxygen, such as silicon dioxide, which is not limited in embodiments of the present disclosure.

Since most biomolecules are negatively charged, taking slowing the translocation of negatively charged biomolecules as an example, embodiments of the present disclosure provide two modes for slowing the translocation of biomolecules.

In mode 1, a negative voltage is applied to the first micro-channel 1 (the first electrode 3) on the left, and a positive voltage is applied to the second micro-channel 2 (the second electrode 4) on the right. An electric field is formed between the two micro-channels to provide an electrophoretic force that drives the movement of biomolecules. At the same time, a negative voltage is applied to the control electrode 5, and the ground electrode 13 is grounded. At this point, the control electrode 5 will attract positive charges in the sample solution and negative charges on a surface of the nano-channel 6 to form an electrical double layer, and induces electroosmotic flow to the left. Since the biomolecules are negatively charged, the biomolecules will move to the right under the driving of electrophoretic force and to the left under the friction resistance between water and the biomolecules. Therefore, the translocation of the biomolecules will be slowed down under the combined action of the friction resistance between water and the biomolecules and the resistance of electroosmotic flow.

In mode 2, a negative voltage is applied to the first micro-channel 1 (the first electrode 3) on the left, and a positive voltage is applied to the second micro-channel 2 (the second electrode 4) on the right. An electric field is formed between the two micro-channels to provide an electrophoretic force that drives the movement of biomolecules. At the same time, a positive voltage is applied to the control electrode 5, and the ground electrode 13 is grounded. When a concentration of a biological sample solution is high, although the induced electroosmotic flow direction is the same as the movement direction of the biomolecules, due to a thin electrical double layer, the electroosmotic flow will be inhibited, and the role of the electroosmotic flow in promoting the translocation of biomolecules is weak. At the beginning, in the micro-channel, the biomolecules are moved rightwards by the action of the electrophoretic force and are also subjected to the frictional resistance between the sample solution and the biomolecules. When the biomolecules move into the nano-channel 6, and the distance between the biomolecules and the nano-channel wall is less than Debye length, the biomolecules will be attracted and fixed to the nano-channel wall by the electrostatic effect generated by the electrode on the biomolecules, and at this point, the biomolecules will also be subjected to the friction resistance between the biomolecules and the nano-channel wall. When thermal activation overcomes electrostatic force, the biomolecules will be temporarily released from the surface of the nano-channel, and then be attracted by static electricity and fixed again, so as to repeat a process of "fix"→"release"→"fix"→ "release", and the biomolecules move to the right in a "stick slip" way. The translocation of the biomolecules will be slowed down under the combined action of the friction resistance between the biomolecules and the biological sample solution and the friction resistance between the biomolecules and the nano-channel wall.

In embodiments of the present disclosure, through the comprehensive action of the first electrode, the second electrode, the control electrode and the ion selectivity of the nano-channel, the function of slowing the translocation of biomolecules may be implemented, and the defects of the current fluctuation amplitude and wave time intensity being not enough and vulnerable to external noise caused by the rapid movement of biomolecules in the traditional nanopore sequencing method, may be overcome, which has the effect of slowing the translocation of biomolecules and may greatly improve the detection accuracy.

The substrate according to embodiments of the present disclosure will be described in detail below in combination with FIG. 2 to FIG. 5.

Figure 2:
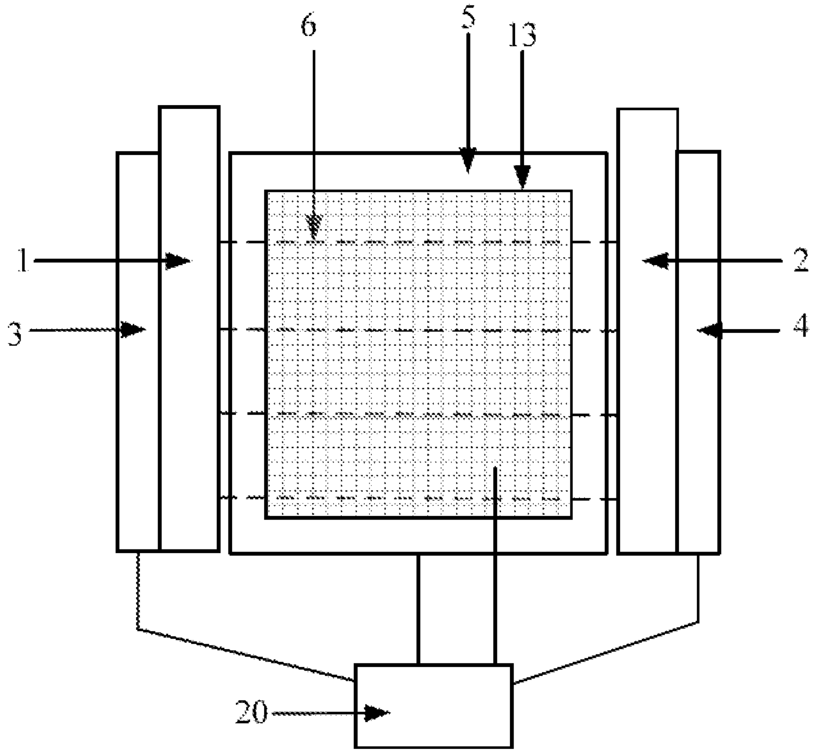
FIG. 2 schematically shows a schematic diagram of a micro-nano fluidic substrate according to embodiments of the present disclosure, wherein a first connection mode in which an electrode on the substrate is connected to a binding area is schematically showed.

In embodiments of the present disclosure, the substrate includes one first electrode, one second electrode, one control electrode and M nano-channels, where M≥1, FIG. 2 schematically shows a schematic diagram of a micro-nano fluidic substrate according to embodiments of the present disclosure, wherein a first connection mode in which an electrode on the substrate is connected to a binding area is schematically showed.

As shown in FIG. 2, the first electrode 3, the second electrode 4, the control electrode 5, and the ground electrode 13 are led out to a binding area 20 (i.e., bonding area) through wires, wherein an orthographic projection of the binding area 20 on the base is located on a third side of the orthographic projection of the nano-channel 6 on the base, and the third side is adjacent to the first side of the orthographic projection of the nano-channel 6 on the base. Different voltages may be applied to the first electrode 3 and the second electrode 4 to form an electric field between the two micro-channels to provide the electrophoretic force that drives the movement of biomolecules. The ground electrode 13 is grounded, and the control electrode 5 is applied with different voltages to regulate a wall charge of the nano-channel, so as to achieve the effect of slowing the translocation of biomolecules with different electrical properties and different electric quantities. After the substrate is made into a chip, the chip may be integrated with other single molecule sequencing units to achieve large-scale high-throughput sequencing.

In embodiments of the present disclosure, the substrate includes M first electrodes. M second electrodes, one control electrode and M nano-channels, where M≥2.

Figure 3:
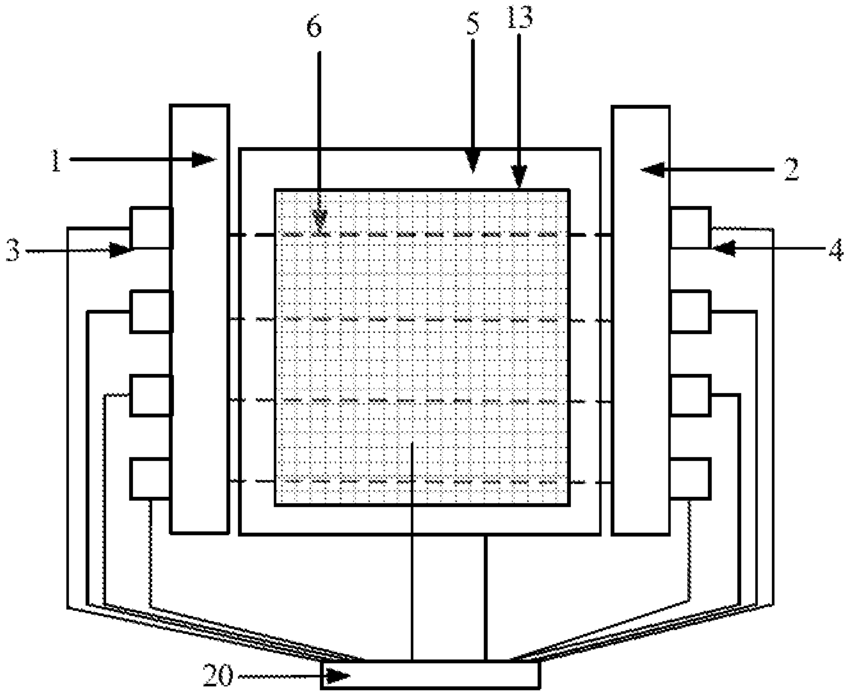
FIG. 3 schematically shows a schematic diagram of a micro-nano fluidic substrate according to embodiments of the present disclosure, wherein a second connection mode in which an electrode on the substrate is connected to a binding area is schematically showed.

FIG. 3 schematically shows a schematic diagram of a micro-nano fluidic substrate according to embodiments of the present disclosure, wherein a second connection mode in which an electrode on the substrate is connected to a binding area is schematically showed.

As shown in FIG. 3, in the embodiment, the first electrode 3 and the second electrode 4 are divided into multiple (only four are schematically shown in FIG. 3), the number of which is the same as the number of the nano-channel 6, wherein the first electrode 3, the second electrode 4, the control electrode 5 and the ground electrode 13 are led out to the binding area 20 (i.e. bonding area) through wires. Voltages with different electrical properties and different sizes may be applied to different first electrodes 3 and second electrodes 4 to change the direction and size of electrophoresis, so as to implement a simultaneous slowing of translocation of biomolecules of different sizes and structures in a plurality of nano-channels 6. After the substrate is made into a chip, the chip may be integrated with other single molecule sequencing units to achieve simultaneous sequencing of a variety of biomolecules.

In embodiments of the present disclosure, the substrate includes one first electrode, one second electrode, M control electrodes and M nano-channels, where M≥2.

Figure 4:
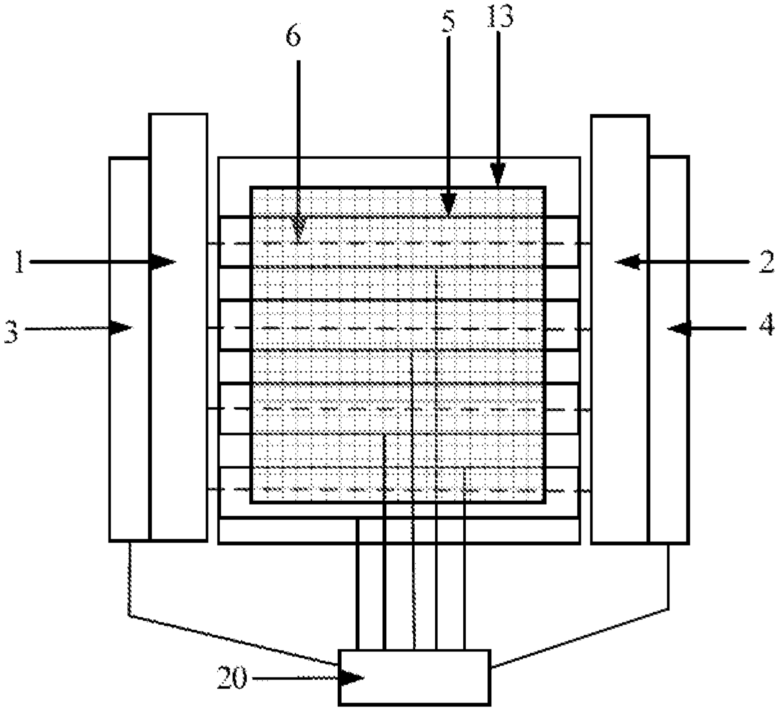
FIG. 4 schematically shows a schematic diagram of a micro-nano fluidic substrate according to embodiments of the present disclosure, wherein a third connection mode in which an electrode on the substrate is connected to a binding area is schematically showed.

FIG. 4 schematically shows a schematic diagram of a micro-nano fluidic substrate according to embodiments of the present disclosure, wherein a third connection mode in which an electrode on the substrate is connected to a binding area is schematically showed.

As shown in FIG. 4, in this embodiment, the control electrode 5 are divided into multiple (only four are schematically shown in FIG. 4), the number of which is the same as the number of the nano-channel 6, wherein the first electrode 3, the second electrode 4, the control electrode 5 and the ground electrode 13 are led out to the binding area 20 (i.e., bonding area) through wires. Voltages with different electrical properties and different sizes may be applied to different control electrodes 5, so that the walls of a plurality of nano-channels may be charged with different electrical properties or different concentrations, so as to implement a simultaneous slowing of translocation of biomolecules of different sizes and structures in the plurality of nano-channels. After the substrate is made into a chip, the chip may be integrated with other single molecule sequencing units to achieve simultaneous sequencing of a variety of biomolecules.

In embodiments of the present disclosure, the substrate includes M first electrodes, M second electrodes, M control electrodes and M nano-channels, where M≥2.

Figure 5:
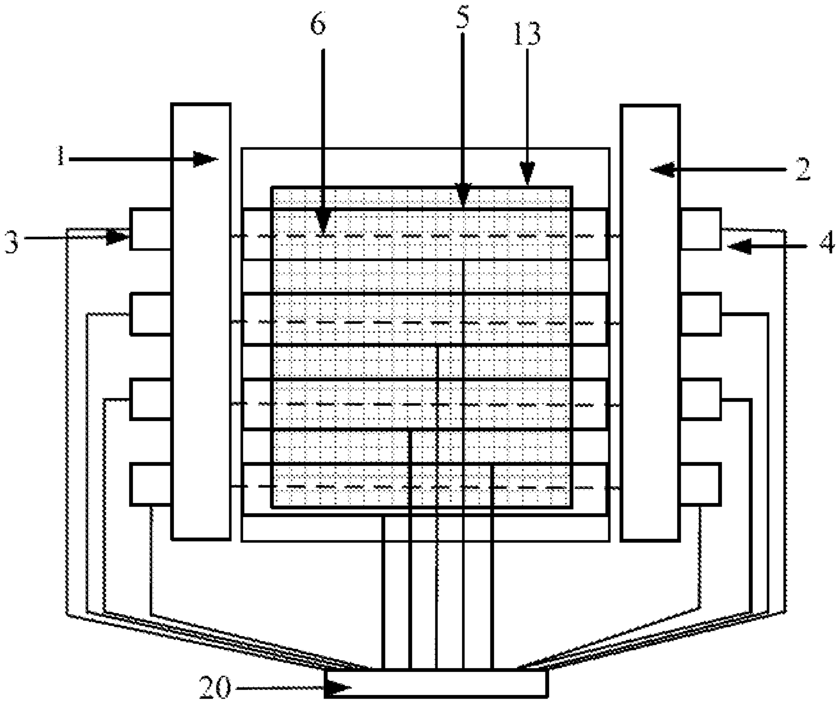
FIG. 5 schematically shows a schematic diagram of a micro-nano fluidic substrate according to embodiments of the present disclosure, wherein a fourth connection mode in which an electrode on the substrate is connected to a binding area is schematically showed.

FIG. 5 schematically shows a schematic diagram of a micro-nano fluidic substrate according to embodiments of the present disclosure, wherein a fourth connection mode in which an electrode on the substrate is connected to a binding area is schematically showed.

As shown in FIG. 5, in this embodiment, the control electrode 5, the first electrode 3, and the second electrode 4 are divided into multiple (only four are schematically shown in FIG. 5), the number of which is the same as the number of the nano-channel 6, wherein the first electrode 3, the second electrode 4, the control electrode 5 and the ground electrode 13 are led out to the binding area 20 (i.e., bonding area) through wires. Voltages with different electrical properties and different sizes may be applied to different control electrodes 5, different first electrodes 3 and second electrodes 4 to change the direction and size of electrophoresis, so that the walls of a plurality of nano-channels may be charged with different electrical properties or different concentrations, so as to implement a simultaneous slowing of translocation of biomolecules of different sizes and structures in the plurality of nano-channels. After the substrate is made into a chip, the chip may be integrated with other single molecule sequencing units to achieve simultaneous sequencing of a variety of biomolecules.

The substrate according to embodiments of the present disclosure may achieve the effect of simultaneously slowing the translocation of biomolecules of different sizes and structures by changing the electrode structures of the control electrode, the first electrode and the second electrode, and applying different voltages. After the substrate is made into a chip, the chip may be integrated with other single molecule sequencing units to achieve simultaneous sequencing of a variety of biomolecules.

Figure 6:
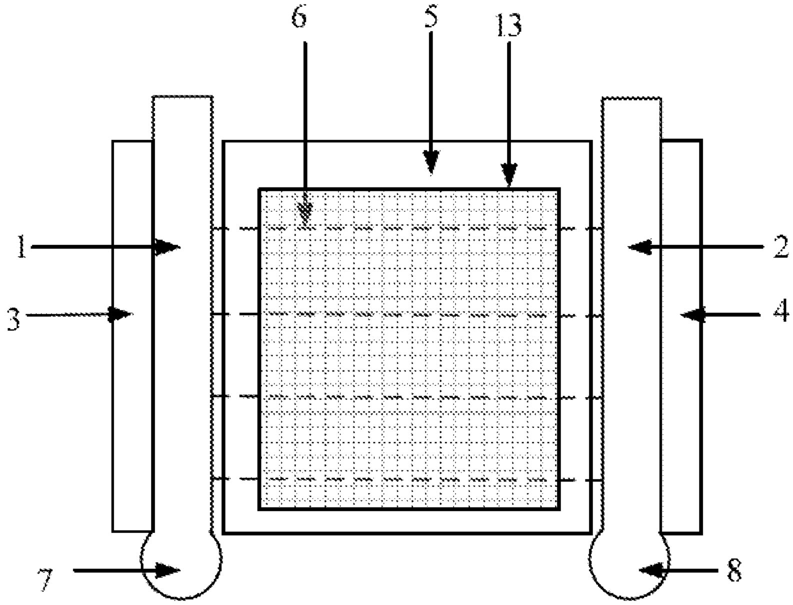
FIG. 6 schematically shows a top view of a micro-nano fluidic chip according to embodiments of the present disclosure.

FIG. 6 schematically shows a top view of a micro-nano fluidic chip according to embodiments of the present disclosure.

As shown in FIG. 6, embodiments of the present disclosure provide a micro-nano fluidic chip, and the chip includes the substrate described above. The micro-nano fluidic chip according to embodiments of the present disclosure includes: a first electrode 3, a second electrode 4, a control electrode 5, a nano-channel 6, a first micro-channel 1, a second micro-channel 2, a liquid inlet 7 and a liquid outlet S, wherein the liquid inlet 7 is used for adding a sample to be tested, the liquid outlet 8 is used for exporting the sample after the test is finished, and the liquid inlet 7 or the liquid outlet 8 may be connected with a conduit for sample injection or sample export collection. The control electrode 5, the first electrode 3 and the second electrode 4 are respectively connected with the external power supply through the internal wiring of the chip, and the chip substrate and the cover plate are bonded and packaged to obtain a micro-nano fluidic chip for slowing the movement of biomolecules. During the use of the chip, if the electric field at both ends of the first electrode and the second electrode is small (tens of kilovolts per meter), that is, the electric field required to drive the movement of biomolecules is small, applying positive control electrode voltage will help to slow down the translocation of biomolecules. For example, Vg=9V may reduce the translocation speed of biomolecules by one order of magnitude: if the electric field at both ends of the first electrode and the second electrode is large (several thousand kilovolts per meter), applying a negative control electrode voltage will help to slow down the translocation of biomolecules. For example, Vg=−0.25V may reduce the translocation speed of biomolecules by one order of magnitude, the specific voltage value needs to be adjusted according to actual conditions, which is not limited in embodiments of the present disclosure.

FIG. 7A schematically shows a cross-sectional view of a micro-nano fluidic chip in a direction perpendicular to a nano-channel according to embodiments of the present disclosure. FIG. 7B schematically shows a cross-sectional view of a micro-nano fluidic chip in a direction parallel to a nano-channel according to embodiments of the present disclosure.

As shown in FIG. 7A and FIG. 7B, in embodiments of the present disclosure, the chip further includes: a cover plate 15 located above the substrate; and a bonding layer 16 located above the substrate and used to bond the substrate and the cover plate 15, wherein the cover plate 15 includes a second groove 17, and an orthographic projection of the second groove 17 on the base 9 covers an orthographic projection of the micro-channel on the base 9.

It should be noted that the material of the bonding layer 16 includes oxides formed by silicon and oxygen, such as silicon dioxide, which is not limited in embodiments of the present disclosure. The cover plate 15 may be glass or PDMS cover plate, which is not limited in embodiments of the present disclosure.

As shown in FIG. 7A, the micro-nano fluidic chip is rectangular, for example, the size of the rectangle is 70×40 mm, the main structure of the micro-nano fluidic chip from bottom to top is as follows: the base 9, the electrode layer 10, the groove layer 21 prepared by nanoimprint adhesive or EBL adhesive, the nano-channel 6, the ground electrode 13, and the cover plate 15. The first groove 12 structure used to prepare the nano-channel 6 may be rectangular, semicircular and other arbitrary shapes (rectangle is taken as an example in FIG. 7). The first electrode 3, the second electrode 4, the control electrode 5 and the ground electrode 13 may be prepared by depositing metal through Sputter or ALD, depositing metal or a-Si through CVD, doping after ELA crystallization, evaporating metal or spraying conductive polymer such as PEDOT and the like and then curing, and are connected to the external power supply through the internal wiring of the chip.

As shown in FIG. 7B, the main structure of the micro-nano fluidic chip from bottom to top is as follows: the base 9, the control electrode 5 and the first electrode 3 and the second electrode 4 prepared with the same mask, the groove layer 21 prepared with nanoimprint adhesive or EBL adhesive, the nano-channel 6, the ground electrode 13, and the cover plate 15. Similarly, the first electrode 3 and the second electrode 4 are also connected with the external power supply through the internal wiring of the chip. The first micro-channel 1 and the second micro-channel 2 are prepared by dry etching and perpendicular to the nano-channel 6. In addition, the cover plate 15 of the chip is provided with a second groove 17 (non-penetrating) at the same position as the micro-channel on the chip substrate. For example, the depth and width of the second groove 17 are both 70 μm, and the length of the second groove 17 is 120 μm. The cover plate 15 is further provided with a liquid inlet 7 and a liquid outlet 8 (penetrating the cover plate, as shown in FIG. 6) connecting an external conduit. For example, the diameters of the liquid inlet 7 and the liquid outlet 8 are 3 mm.

The micro-nano fluidic chip of embodiments of the present disclosure may slow down the translocation of biomolecules and improve the sequencing accuracy of nanopores. Furthermore, after integrating the micro-nano fluidic chip with nanopores or other single molecule sequencing units, large-scale high-throughput sequencing may be achieved, which is of great significance to the development of biomedical, drug diagnosis, environmental monitoring, molecular biology and other fields.

In addition, the micro-nano fluidic chip according to embodiments of the present disclosure may change the electrode structures of the control electrode, the first electrode and the second electrode, and apply different voltages, so as to implement the effect of simultaneously slowing the translocation of biomolecules of different sizes and structures. After the micro-nano fluidic chip is integrated with other single molecule sequencing units, simultaneous sequencing of a variety of biomolecules may be achieved.

Figure 8:
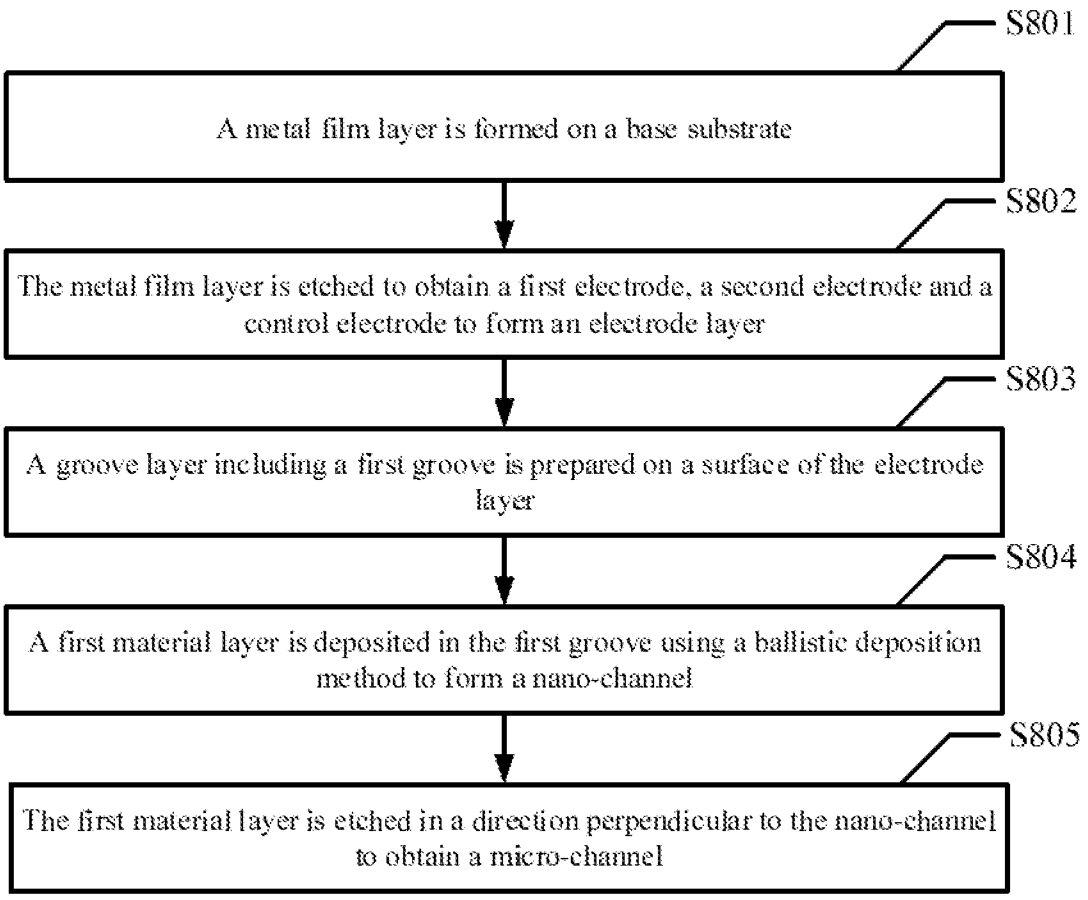
FIG. 8 schematically shows a flow chart of preparing a micro-nano fluidic substrate according to embodiments of the present disclosure.

FIG. 8 schematically shows a flow chart of preparing a micro-nano fluidic substrate according to embodiments of the present disclosure.

As shown in FIG. 8, the method for preparing the micro-nano fluidic substrate according to embodiments of the present disclosure includes the following steps.

In operation S801: a metal film layer 18 is formed on a base.

In operation S802: the metal film layer 18 is etched to obtain a first electrode 3, a second electrode 4 and a control electrode 5, so as to form an electrode layer 10.

In operation S803: a groove layer 21 including a first groove 12 is prepared on a surface of the electrode layer 10.

In operation S804: a first material layer 19 is deposited in the first groove 12 using a ballistic deposition method, so as to form a nano-channel 6.

In operation S805: the first material layer 19 is etched in a direction perpendicular to the nano-channel 6, so as to obtain a micro-channel.

It should be noted that the first material layer 19 includes oxides formed by silicon and oxygen, such as silicon dioxide, which is not limited in embodiments of the present disclosure.

As shown in FIG. 7A and FIG. 7B, in embodiments of the present disclosure, before the preparing the groove layer 21 including the first groove 12 on the surface of the electrode layer 10, the method further includes: depositing the second material layer 14 on the electrode layer 10 to prevent the control electrode 5 from being in communication with the nano-channel 6 or the micro-channel. The second material layer 14 includes oxides formed by silicon and oxygen, such as silicon dioxide, which is not limited in embodiments of the present disclosure.

It should be noted that in embodiments of the present disclosure, the first material layer 19 used to form the nano-channel 6 is deposited by the ballistic deposition method, rather than by the CVD method. This is because the film layer deposition rates of the ballistic deposition in the interior of the substrate groove and at the opening are different, which will eventually seal to form the nano-channel, while PECVD is isotropic deposition, and the film deposition rates in the interior of the substrate groove and at the opening are the same, which will eventually form a pit, and may not obtain the nano-channel required for the chip.

Figure 9A:
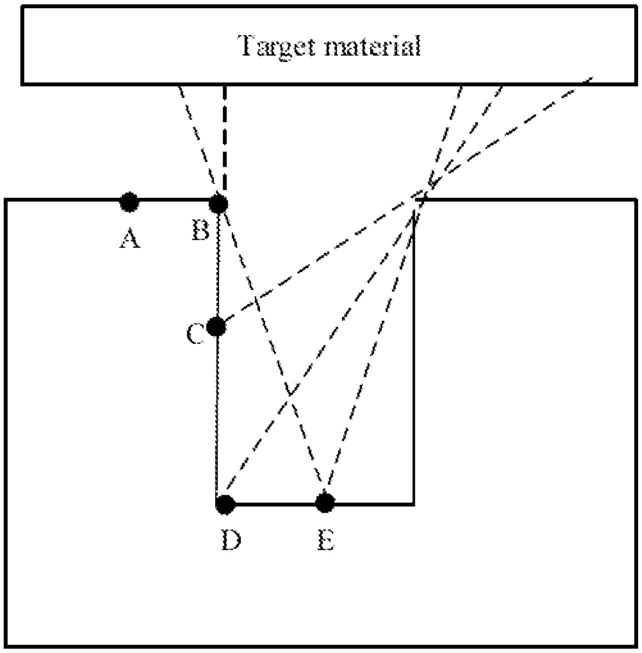
FIG. 9A schematically shows a schematic diagram before forming a nano-channel according to embodiments of the present disclosure.
Figure 9B:
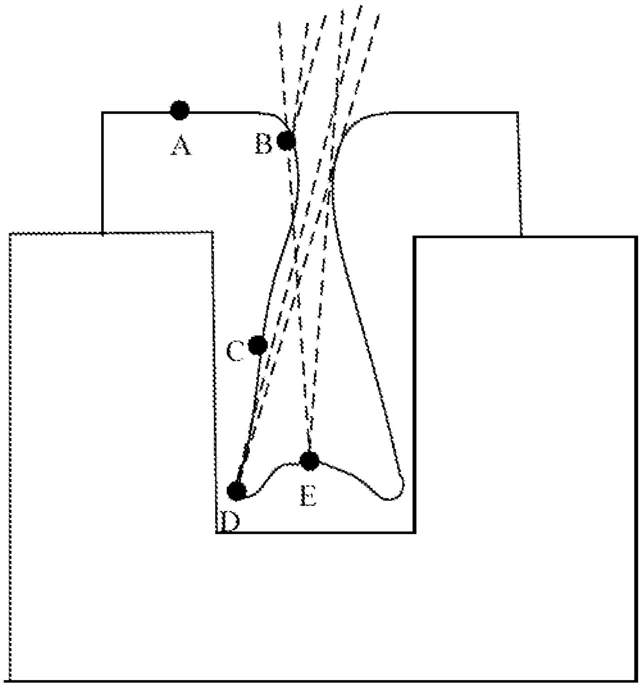
FIG. 9B schematically shows a schematic diagram after forming a nano-channel according to embodiments of the present disclosure.

FIG. 9A schematically shows a schematic diagram before forming a nano-channel according to embodiments of the present disclosure. FIG. 9B schematically shows a schematic diagram after forming a nano-channel according to embodiments of the present disclosure.

As shown in FIG. 9A, when the film layer is deposited on the substrate with a groove by the ballistic deposition method, the deposition rates at different positions inside and outside the groove are different, and the deposition rate at a certain point on the substrate is determined by a target material area that may be deposited at that point on the target material. It may be approximately considered that the deposition rate is proportional to the effective angle between the point and the target material. Therefore, for a groove structure with moderate aspect ratio, before deposition (FIG. 9A), the relationship between the longitudinal deposition rates of point A to point E is PA≈PB PC>PE>PD, and the relationship between the horizontal deposition rates is HB>HC HD. With a prolongation of deposition time, the effective angles (deposition rates) of point A, point B to the target material are almost unchanged, while the effective angles (deposition rate) of position C to position E to the target material are gradually reduced, as shown in FIG. 9B below. Since the deposition rate of point B is always significantly faster than that of each position inside the groove, the materials deposited on the groove will eventually seal and form the nano-channel.

Figure 10:
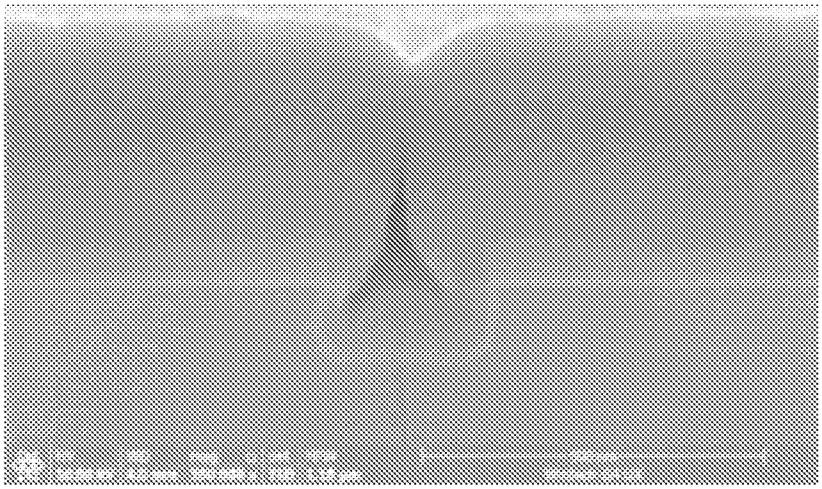
FIG. 10 schematically shows a nano-channel SEM photograph according to embodiments of the present disclosure.

FIG. 10 schematically shows a nano-channel SEM photograph according to embodiments of the present disclosure.

As shown in FIG. 10, a final nano-channel formed by the deposition may be seen. Whether the groove may finally be closed to form the nano-channel depends on an aspect ratio of the groove and a thickness of the first material layer deposited. A large number of experiments prove that when the thickness of the first material layer is 600 nm, when the aspect ratio of the groove is greater than 0.3, it is easier to form the nano-channel and when the groove is circular, a water-drop-shaped nano-channel with high flux and better uniformity may be obtained.

In embodiments of the present disclosure, in the depositing the first material layer in the first groove using the ballistic deposition method, the aspect ratio of the first groove is greater than 0.3, and the thickness of the deposited first material layer is 600 nm.

Embodiments of the present disclosure uses the ballistic deposition method to prepare the nano-channel, which has simple process, low cost, good uniformity, strong stability and strong liquid control capability, and is suitable for large-scale mass production.

As shown in FIG. 7A and FIG. 7B, in embodiments of the present disclosure, the method for preparing the micro-nano fluidic substrate further includes: preparing the ground electrode 13 above the nano-channel 6, and the ground electrode 13 may be prepared by spraying conductive polymers such as PEDOT on the nano-channel 6 and then curing, or by other methods, which is not limited in embodiments of the present disclosure.

FIG. 11A to FIG. 11E schematically show cross-sectional views of a micro-nano fluidic substrate formed after some steps of a method for preparing a micro-nano fluidic substrate have been performed, in a direction perpendicular to a nano-channel, according to embodiments of the present disclosure. FIG. 12A to FIG. 121 schematically show cross-sectional views of a micro-nano fluidic substrate formed after some steps of a method for preparing a micro-nano fluidic substrate have been performed, in a direction parallel to a nano-channel, according to embodiments of the present disclosure.

As shown in FIG. 1A to FIG. 11E and FIG. 12A to FIG. 121, the specific steps of preparing the micro-nano fluidic substrate according to embodiments of the present disclosure include S1 to S5.

In Step S1:

In S1-1: first, the metal film layer 18 is prepared on the base 9 by depositing metal through Sputter or ALD, depositing metal or a-Si through CVD, doping after ELA crystallization, evaporating metal or spraying conductive polymer such as PEDOT and the like and then curing (the present disclosure takes depositing 500 nm thick Cu by Sputter as an example).

In S1-2: the metal film layer 18 is etched to form three electrodes: the control electrode 5, the first electrode 3 and the second electrode 4 (the electrode size depends on the nano-channel and the spacing of the nano-channels, and the size of micro-channel; in the present disclosure, the control electrode 5 is 4 mm long and 30 μm wide: the first electrode 3 and the second electrode 4 are both 4 mm long and 10 μm wide).

In S1-3: in order to avoid a chip failure caused by a contact between the control electrode and the sample solution in the micro-channel during a working process of the chip, a step generated by etching is filled up by depositing the second material layer 14 through CVD or ALD, which may also prevent the imprinting or EBL pattern loss caused by the existence of the mismatch during the preparation of the groove structure necessary for forming the nano-channel.

In Step S2: by means of nanoimprint or EBL, (in the present disclosure, the nanoimprint is taken as an example, and a thickness of the imprinting adhesive is 2 μm), a groove layer 21 including a first groove 12 is prepared on the surface of the electrode layer 10. The bottom of the first groove 12 of the groove layer 21 may be of different shapes (in the present disclosure, a rectangle is taken as an example, and the width of the groove is 30 nm, and the depth of the groove is 90 nm).

In Step S3:

In S3-1: a 600 nm first material layer 19 is deposited by the ballistic deposition method to form the nano-channel 6.

In S3-2: the first micro-channel 1 and the second micro-channel 2 are prepared by dry etching in a vertical direction of the nano-channel 6 (the width and depth of the micro-channel are both 50 μm), wherein the film layer 11 includes the first micro-channel 1, the second micro-channel 2, the nano-channel 6 and the groove layer 21.

In Step S4: the ground electrode 13 is prepared by spraying, conductive polymer such as PEDOT above the nano-channel 6 and then curing.

In Step S5:

In S5-1: the bonding layer 16 is deposited through CVD or ALD (in the present disclosure, depositing 600 nm SiO2 through CVD is taken as an example).

In S5-2: the bonding layer 16 is etched to form the first micro-channel 1 and the second micro-channel 2, and thus, a preparation of the chip substrate is completed.

Figure 13:
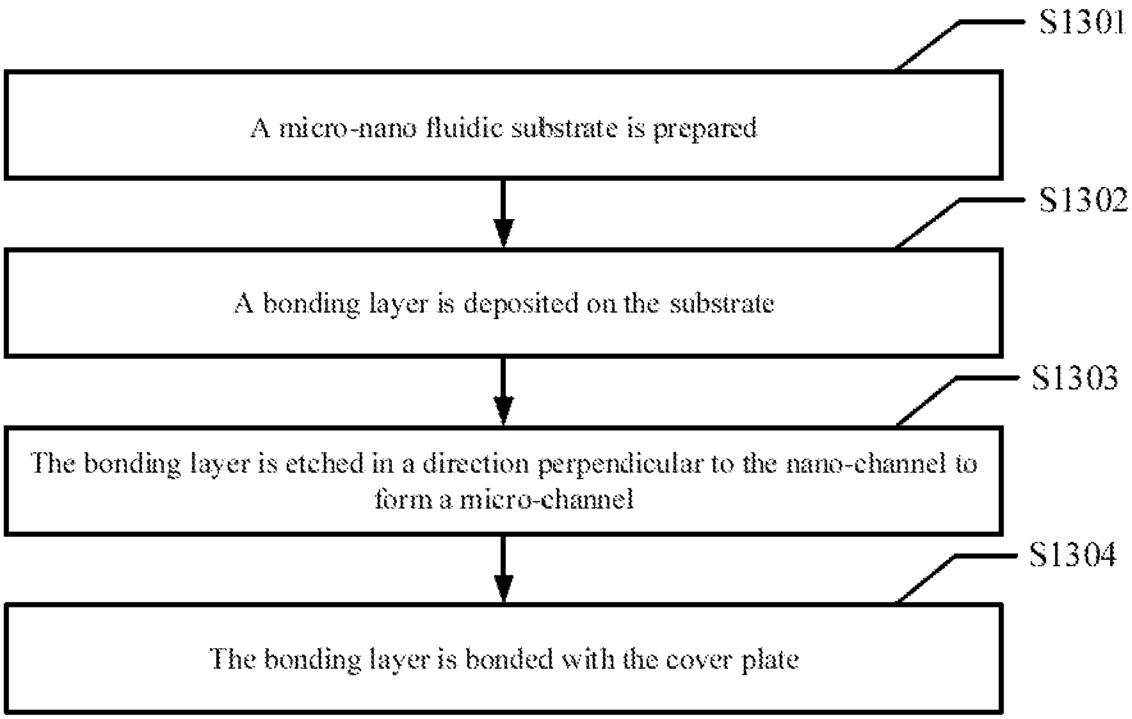
FIG. 13 schematically shows a flow chart of preparing a micro-nano fluidic chip according to embodiments of the present disclosure.

FIG. 13 schematically shows a flow chart of preparing a micro-nano fluidic chip according to embodiments of the present disclosure.

As shown in FIG. 13, the method for preparing the micro-nano fluidic chip according to embodiments of the present disclosure includes the following steps.

In S1301: a micro-nano fluidic substrate is prepared according to the method described above.

In S1302: a bonding layer is deposited on the substrate.

In S1303: the bonding layer is etched in a direction perpendicular to the nano-channel to form a micro-channel: since the micro-channel on the substrate is covered by the bonding layer when depositing the bonding layer, it is necessary to etch the bonding layer to etch out the micro-channel again.

In S1304: the bonding layer is bonded with the cover plate to obtain a micro-nano fluidic chip.

Embodiments of the present disclosure provides a micro-nano fluidic system, including the micro-nano fluidic chip described above and a power supply, wherein the micro-nano fluidic chip further includes an internal wire, the first electrode, the second electrode and the control electrode are connected with the power supply through the internal wire, which reduces a complexity of the connection between the chip and the power supply.

Those skilled in the art will appreciate that features recited in the various embodiments of the present disclosure and/or the claims may be combined and/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

Embodiments of the present disclosure have been described above. However, these examples are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A micro-nano fluidic substrate, comprising:

a base;

an electrode layer located on the base, wherein the electrode layer comprises a first electrode, a second electrode and a control electrode; and a film layer located on the electrode layer and away from the base, wherein the film layer comprises a groove layer, a nano-channel and a micro-channel, the groove layer comprises a first groove, the nano-channel is located in the first groove, an orthographic projection of the nano-channel on the base at least partially coincides with an orthographic projection of the control electrode on the base, and the micro-channel is in communication with the nano-channel, wherein the micro-channel comprises a first micro-channel and a second micro-channel, an orthographic projection of the first micro-channel on the base is located on a first side of an orthographic projection of the nano-channel on the base, the first micro-channel is in communication with the first electrode, an orthographic projection of the second micro-channel on the base is located on a second side of the orthographic projection of the nano-channel on the base, the second micro-channel is in communication with the second electrode, and the first side and the second side are opposite sides of the orthographic projection of the nano-channel on the base.

2. The substrate according to claim 1, wherein an aspect ratio of the first groove is greater than 0.3.

3. The substrate according to claim 1, further comprising: a ground electrode configured as a reference electrode for the first electrode, the second electrode and the control electrode, wherein the ground electrode is located on a side of the film layer away from the base, and an orthographic projection of the ground electrode on the base is at least partially overlapped with the orthographic projection of the control electrode on the base.

4. The substrate according to claim 3, wherein a second material layer is filled between the first electrode and the control electrode, and between the second electrode and the control electrode.

5. The substrate according to claim 1, wherein the substrate comprises one first electrode, one second electrode, one control electrode and M nano-channels, where M≥1.

6. The substrate according to claim 1, wherein the substrate comprises M first electrodes, M second electrodes, one control electrode and M nano-channels, where M≥2.

7. The substrate according to claim 1, wherein the substrate comprises one first electrode, one second electrode, M control electrodes and M nano-channels, where M≥2.

8. The substrate according to claim 1, wherein the substrate comprises M first electrodes, M second electrodes, M control electrodes and M nano-channels, where M≥2.

9. A micro-nano fluidic chip, comprising:

the substrate according to claim 1.

10. The chip according to claim 9, further comprising:

a cover plate located above the substrate; and a bonding layer located above the substrate and configured to bond the substrate and the cover plate, wherein the cover plate comprises:

a second groove, wherein an orthographic projection of the second groove on the base covers an orthographic projection of the micro-channel on the base;

a liquid inlet configured to add a sample to be tested; and a liquid outlet configured to export the sample after a test is finished.

11. A method for preparing a micro-nano fluidic substrate, wherein the micro-nano fluidic substrate comprises:

a base;

an electrode layer located on the base, wherein the electrode layer comprises a first electrode, a second electrode and a control electrode; and a film layer located on the electrode layer and away from the base, wherein the film layer comprises a groove layer, a nano-channel and a micro-channel, the groove layer comprises a first groove, the nano-channel is located in the first groove, an orthographic projection of the nano-channel on the base at least partially coincides with an orthographic projection of the control electrode on the base, and the micro-channel is in communication with the nano-channel, wherein the micro-channel comprises a first micro-channel and a second micro-channel, an orthographic projection of the first micro-channel on the base is located on a first side of an orthographic projection of the nano-channel on the base, the first micro-channel is in communication with the first electrode, an orthographic projection of the second micro-channel on the base is located on a second side of the orthographic projection of the nano-channel on the base, the second micro-channel is in communication with the second electrode, and the first side and the second side are opposite sides of the orthographic projection of the nano-channel on the base, and wherein the method comprises:

forming a metal film layer on the base;

etching the metal film layer to obtain the first electrode, the second electrode and the control electrode, so as to form the electrode layer;

preparing the groove layer comprising the first groove on a surface of the electrode layer;

depositing a first material layer in the first groove using a ballistic deposition method, so as to form the nano-channel; and etching the first material layer in a direction perpendicular to the nano-channel, so as to obtain the micro-channel.

12. The method according to claim 11, before the preparing the groove layer comprising the first groove on a surface of the electrode layer, further comprising:

depositing a second material layer on the electrode layer to prevent the control electrode from being in communication with the nano-channel or the micro-channel.

13. The method according to claim 11, in the depositing a first material layer in the first groove using a ballistic deposition method, an aspect ratio of the first groove is greater than 0.3, and a thickness of the deposited first material layer is 600 nm.

14. The method according to claim 13, further comprising:

preparing a ground electrode above the nano-channel.

15. A method for preparing a micro-nano fluidic chip, comprising:

preparing a substrate according to the method of claim 11;

depositing a bonding layer on the substrate;

etching the bonding layer in the direction perpendicular to the nano-channel, so as to form the micro-channel; and bonding the bonding layer with the cover plate.

16. A micro-nano fluidic system, comprising the micro-nano fluidic chip according to claim 9.

* * * * *